3,139,324
METHOD FOR PURIFYING GASES
Jean Housset, Rouen, France, assignor to Societe Chimique de la Grande Paroisse, Paris, France, a French body corporate
No Drawing. Filed May 4, 1961, Ser. No. 107,661
Claims priority, application France May 12, 1960
2 Claims. (Cl. 23—2)

The methods for removing the acid components $CO_2$ and $H_2S$ out of the gases obtained in industrial plants may be classified in two main groups: chemical methods and physical dissolution methods.

First group of methods: some of said methods consist in washing the gases by means of an aqueous solution of a product having an alkaline reaction, such as ammonia, soda, potash, ethanolamines or alkaline carbonates. The acid gases are combined as chemical compounds which are thenafter decomposed by heat, generally at boiling temperature and the solution thus regenerated may be recycled for the washing of the untreated gases.

Said methods of which the efficiency is well known show however numerous drawbacks: They require a large consumption of heat, they lead to unavoidable losses of reagents in operations executed on a commercial scale and they become rapidly too expensive, by reason of the large gradual concentration of the lyes used, while the corrosion of the metals forming the plant is greater by reason of the temperatures used and, in the particular case of $H_2S$, the colloidal sulfur appearing generally in the solutions following the formation of metal polysulfides leads to the requirement of a draining and consequent loss or of a filtration which rapidly increases the cost of operation.

Other methods retaining the use of concentrated aqueous solutions of a metal salt, chiefly an alkaline salt, allow operating at room temperature, both for the absorption of the acid gases and for their evolution out of the washing solution. Although such methods cut down substantially the consumption of heat, they show also a number of drawbacks, as mentioned hereinabove, chiefly the high cost price consequent to the loss of the reagent, the formation of colloidal sulfur by the metal polysulfides which requires further treatments for removing said colloidal sulfur.

Second group of methods: Another procedure for removing the acid gases consists in washing with pure water under high pressure conditions. Numerous techniques provide for the execution of said method and, in particular, that disclosed in the French Patent 1,123,777 in the name of the assignee. This is one of the simplest techniques and one of the least expansive and leads to good results.

However, it has been found repeatedly that the simultaneous presence of $CO_2$ and $H_2S$ in comparatively low amounts but at concentrations which are of the same magnitude, makes the elimination of $H_2S$ much more difficult through this method, chiefly when high pressures are used.

On the other hand, the possible presence of very small amounts of liquid hydrocarbons has often for its result the formation of froth, which reduces the efficiency of the washing and makes the control of the operation a difficult matter. This is in fact true, whatever may be the method used.

My invention is applicable chiefly to the treatment of gases compressed under pressures above or equal to 10 kg. per sq. cm. and has for its object to remove the disturbing action of $CO_2$ on the dissolution in water of sulfuretted hydrogen without hindering by any means the dissolution of the actual carbon dioxide.

On the other hand, it disturbs considerably and in numerous cases, cuts out entirely the formation of froth ascribable generally to the presence of small amounts of liquid hydrocarbons.

To this end, it consists in introducing into the washing water very small amounts ranging between 0.20 gram molecule and 0.02 gram molecule of the following substances:

Ethanolamine having preferably no hydrogen atom bound directly with a nitrogen atom, A polyacid mineral acid, the remaining acidity of which is very weak, such as phosphoric acid, the molecular ratios being such that the pH of the washing solution remains slightly lower than or at the maximum equal to 8.

When operating under such conditions, the pH of the various acids to be considered allows classifying them in the following sequence:

$$CO_3H^-, SH^=, PO_4H^-$$

The ionization of the acid gases dissolved may be obtained at the expense of the salt of the weak acid and of the amine, which cuts out thus the disturbing action of $CO_2$ on $H_2S$.

On the other hand, the presence of the amine furthers the dissolution of $H_2S$. It should be remarked that the method considered, although it resorts to ethanolamine has, in fact, no relationship with the methods of the first group referred to hereinabove and which resort also, if required, to ethanolamines. In fact, the present invention resorts to very low contents of ethanolamine with a view to improving the solubility of $H_2S$ in water, whereas in the case of the prior known methods referred to hereinabove, ethanolamine is used in very much larger proportions, so as to neutralize both $CO_2$ and $H_2S$.

In practice, the elimination of acid gases through a washing in water under pressure and also the regeneration of the absorbent solution may be performed through any known method of washing with water under pressure and, chiefly in accordance with the method described in the above referred to patent, which produces the expansion of water in two or more successive stages under increasingly lower pressures.

Of course, in the execution of the method disclosed, it is of interest for the washing water containing ethanolamine and a weak acid, to be recycled in a closed circuit.

The following examples given merely by way of exemplification and by no means in a limiting sense, make the advantages provided by the invention appear as compared with the prior methods of washing with water under pressure.

*Example 1*

1 litre of a solution containing 0.10 gram molecule of methyldiethanolamine and 0.05 gram molecule of phosphoric acid may dissolve under an absolute pressure of 6 kg. per sq. cm. at 35° C., 12.4 litres of $H_2S$, whereas 1 litre of pure water can only dissolve 10 litres.

After expansion and blowing with deoxygenated fumes, there remains per litre of solution, only 0.02 litre of $H_2S$ whereas there would remain 0.05 litre if pure water were used for the treatment.

*Example 2*

1 litre of a solution containing 0.10 gram molecule of methyldiethanolamine and 0.05 gram molecule of phosphoric acid may dissolve under an absolute total pressure of 6 kgs. per sq. cm. at 35° C., 3.8 litres of $H_2S$ in a mixture containing 57% of $CO_2$ and 43% of $H_2S$.

Under similar condition, pure water would dissolve only 3 litres of $H_2S$.

Under atmospheric pressure, the same solution treating at a temperature of 35° C. a gas containing 44% of $CO_2$ and 56% of $H_2S$ may dissolve per litre 1.1 litres of $H_2S$; under the same conditions, pure water would dissolve only 0.7 litre whereas the theoretical figure in this latter case is 0.88.

The same solution prevents completely the formation of froth, even in the presence of 2.5% of gasoline.

*Example 3*

1 litre of a solution containing 0.10 gram molecule of dimethylethanolamine and 0.05 gram molecule of phosphoric acid may dissolve under an absolute pressure of 6 kg. per sq. cm. at 35° C., 11.77 litres of $H_2S$, whereas it has been shown that pure water dissolves under the same conditions only 10 litres of $H_2S$.

In brief, the elimination of $H_2S$ through dissolution in water at room temperature is improved even in the presence of $CO_2$ through the addition to said water of a very small amount of active reagents (underneath 0.20 gram molecule).

Said active reagents are generally constituted by ethanolamines and, preferably, ethanolamines in which no hydrogen atom is bound directly to an atom of nitrogen; for instance, there may be mentioned, in this respect, Monomethylethanolamine,
Dimethylethanolamine,
Diethylethanolamine.

The presence of metal salts is to be excluded from the solution, since they have a tendency to form polysulfides which give an objectionable color to the washing water and increase the saline character of the latter while they, furthermore, produce deposits of colloidal sulfur and reduce the rate of recovery of the sulfuretted hydrogen.

Of course, many modifications may be brought to the method disclosed, without unduly widening the scope of the invention as defined in the accompanying claims.

What I claim is:

1. In a method for purifying gases containing both $H_2S$ and $CO_2$, the steps consisting in incorporating with water in the ratio of between about 0.20 gram molecule and 0.02 gram molecule per litre an ethanolamine containing no hydrogen atom bound directly with a hydrogen atom and phosphoric acid, the resultant pH of the aqueous solution being about 8, and washing the gases to be purified with said aqueous solution under pressure.

2. In a method for purifying gases containing both $H_2S$ and $CO_2$, the steps consisting in incorporating with water about 0.10 gram molecule per litre of water of a substance selected from the group consisting of monomethylethanolamine, dimethylethanolamine and diethylethanolamine and about 0.05 gram molecule per litre of water of phosphoric acid, and washing the gases to be purified with said aqueous solution under pressure.

References Cited in the file of this patent

UNITED STATES PATENTS

| | | |
|---|---|---|
| 2,614,904 | Royer | Oct. 21, 1952 |
| 2,638,405 | Frazier | May 12, 1953 |
| 2,722,500 | Rippie et al. | Nov. 1, 1955 |

FOREIGN PATENTS

| | | |
|---|---|---|
| 165,314 | Australia | Sept. 21, 1955 |